United States Patent Office 3,455,151
Patented July 15, 1969

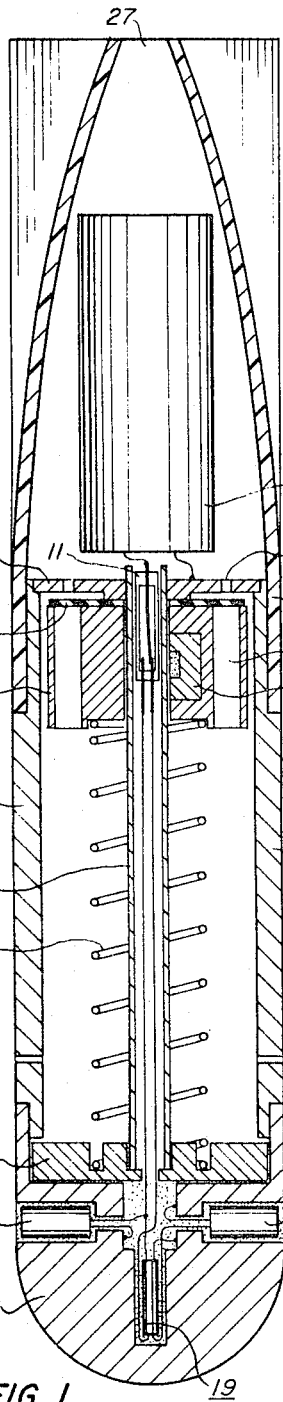
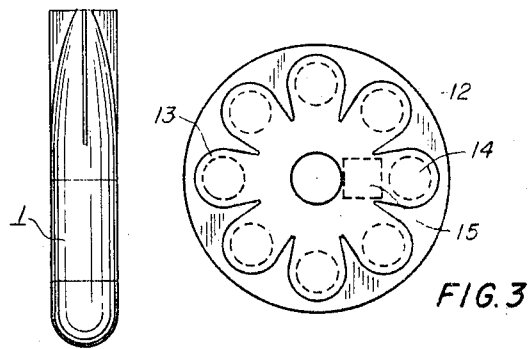
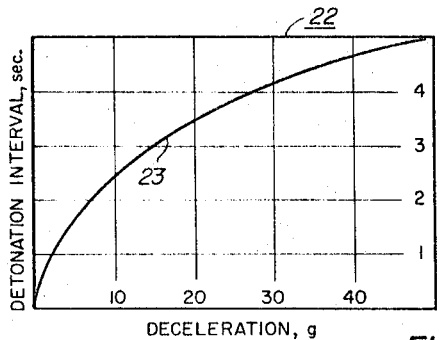
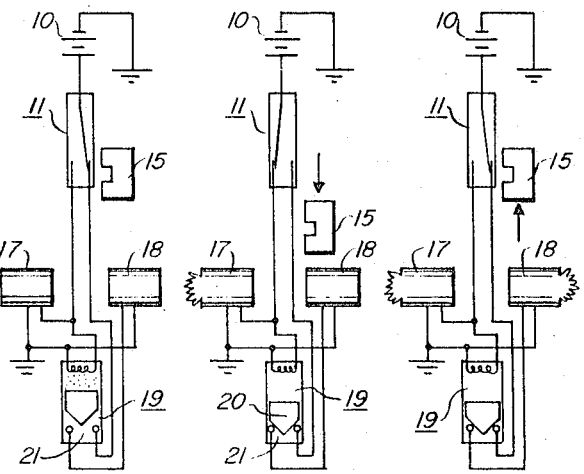

3,455,151
EXPENDABLE OCEAN BOTTOM SENSOR
Joseph D. Richard, Miami, Fla. (531 S. Barrancas Ave., Warrington, Pensacola, Fla. 32507)
Filed Aug. 30, 1966, Ser. No. 576,093
Int. Cl. G01n 3/00
U.S. Cl. 73—84                                                    1 Claim

ABSTRACT OF THE DISCLOSURE

An expendable device for measuring the bearing strength and resistance to penetration of the ocean bottom. The ballistic shaped device sinks at a known and relatively high terminal velocity. Upon striking the bottom, two acoustic pulses are generated which indicates the peak deceleration. The deceleration is inversely proportional to the penetration of the device into the bottom and the time interval between the two acoustic pulses is proportional to the peak deceleration.

This invention relates to the measurement of certain physical characteristics of the ocean bottom. More specifically, the present invention relates to apparatus for measuring and indicating the bearing strength and resistance to penetration of the ocean bottom sediments. Expendable apparatus is described whereby the approximate bearing strength of the sediments may be obtained from the surface without the need for auxiliary equipment of any kind.

In the past the bearing strength or resistance to penetration of the ocean bottom sediments have been obtained by sampling devices of various kinds which were lowered and retrieved by means of a winch and cable. For geological and other scientific studies the actual sediment samples are of primary importance. However, the usual sampling procedure has proven to be time consuming and expensive and otherwise impractical when only bearing strength information is required. Furthermore, in certain types of bottom coring operations in deep water it is desirable to determine the resistance of the sediments to penetration before the actual coring process begins. The apparatus described herein provides a quick and inexpensive determination of penetration resistance and therefore may be used as an adjuctive tool in conventional coring.

The principal object of the present invention is to provide apparatus for determining the resistance to penetration of the sea bed. The apparatus is inexpensive and therefore expendable. No auxiliary equipment is required and the needed information is obtained almost instantly in usable form without data processing or analysis.

The present invention provides an expendable underwater signaling device which sinks at a known and relatively high terminal velocity when dropped into the water. Upon striking the bottom, a pair of acoustic pulses are generated which indicate the deceleration of the device. The deceleration is inversely proportional to the penetration of the device into the bottom. The time interval between the two pulses of the pair is proportional to the deceleration. For example, a short time interval between pulses would indicate a relatively soft bottom and a longer time interval between pulses would indicate a relatively hard bottom.

Other objects and advantages will become more apparent from the study of the following specification and drawings in which:

FIGURE 1 shows a sectional view of the underwater signaling device used for determining the bearing strength or hardness of the ocean bottom.

FIGURE 2 shows the external appearance of the expendable signaling device.

FIGURE 3 shows a top view of the weight which is displaced downward by deceleration of the signaling device.

FIGURE 4 shows the relationship betweeen pulse interval and deceleration for the signaling device shown in FIGURE 1.

FIGURE 5 shows the firing sequence of the two detonations from the signaling device.

Referring more specifically to FIGURE 1, a relatively heavy cylindrical housing 2 is shown containing a bored cylindrical weight 12 coaxially positioned on the tubular support member 7. The spring 6 urges the weight 12 to the upper limit of its sliding range along the tubular support member 7. A series of holes, such as the hole 14, in the cylindrical weight 12 are covered by a series of rubber flaps, such as the flap 13, which are attached to the top surface of the cylindrical weight 12. The rubber flaps, such as the rubber flap 13, open readily when the cylindrical weight 12 is forced downward in response to deceleration. However, the flaps remain closed when the cylindrical weight 12 moves upward along the tubular support member 7 in response to the spring 6 pressure after the deceleration force has ceased. A magnet 15 is mounted within the cylindrical weight 12 adjacent the coaxial bore. A double throw magnetic reed switch 11 is mounted within the top portion of teh tubular support member 7 so that the normally open contact is closed by the proximity of the magnet 15 when the cylindrical weight 12 is at the upper limit of its travel range. A plastic tail assembly 3 is attached to the upper end of the cylindrical housing 2. A water activated battery 10 is contained within the tail assembly 3. A first lead from the battery 10 is connected to the movable contact of the magnetic reed switch 11. A second lead from the battery 10 is grounded to the cylindrical housing 2 through the metal upper spacer 8. The tubular support member 7 is held coaxially within the cylindrical housing 2 by means of the lower spacer 16 and the upper spacer 8. A relatively heavy nosepiece 5 is mounted on the lower end of the cylindrical housing 2. A pair of electrically detonated explosive squibs 17 and 18 are radially mounted within the nosepiece 5. An electrically actuated normally open squib switch 19 is coaxially mounted within the nosepiece 5. A series of holes, such as the holes 25, 9, and 27 admit water into the cylindrical housing 2 and the tail assembly 3 when the device is immersed. The normally closed contact of the magnetic reed switch 11 (shown open) is connected to the explosive squib 17 and the detonator of the squib switch 19. The normally open contact of the magnetic reed switch 11 (shown closed) in connected through the open contacts of the squib switch 19 to the explosive squib 18. The ground side of each of the explosive squibs 17 and 18 and the detonation circuit of the squib switch 19 is connected to the metal nosepiece 5 and thus to the ground side of the battery 10.

When the expendable bottom sensor shown in FIG-

URE 1 is thrown into the ocean, water penetrates into the tail assembly 3 thus activating the battery 10. The device sinks ino the ocean at its terminal velocity of about 20 ft./sec. The cylindrical weight 12 is maintained at the upper limit of its travel along the tubular support member 7 by the spring 6 so that the normally open contact of the magnetic reed switch 11 is closed by the proximity of the magnet 15. When the device strikes the ocean bottom, the deceleration forces the cylindrical weight 12 down along the tubular support member 7 a certain distance proportional to the deceleration. The displacement of the cylindrical weight 12 downward is facilitated by the opening of the flaps, such as the flap 13. When the cylindrical weight 12 is displaced downward, the movable contact of the magnetic reed switch 11 springs to the normally closed position as the influence of the magnet 15 is removed. When the normally closed contact of the magnetic reed switch 11 is closed by the removal of the magnet 15, the explosive squib 17 is detonated and the normally open squib switch 19 is closed. The closure of the squib switch 19 connects the normally open contact of the reed switch 11 to the explosive squib 18. When the device comes to rest on the ocean bottom, the deceleration force ceases and the spring 6 urges the cylindrical weight 12 back toward the upper limit of its travel. The return of the cylindrical weight 12 upward is relatively slow due to the closure of the flaps, such as the flap 13. The time required for the cylindrical weight 12 to return to its initial position is proportional to the distance it was forced down by the deceleraton. When the cylindrical weight 12 reaches its initial position, the magnet 15 causes the normally open contact of the reed switch 11 to close and thus the explosive squib 18 is detonated. It may be seen then that the time interval between the detonations of the explosive squibs 17 and 18 is proportional to the deceleration experienced by the device upon striking the ocean bottom.

FIGURE 3 shows an enlarged top view of the cylindrical weight 12 and the position of the holes (such as 14), the flaps (such as 13), and the magnet 15.

FIGURE 4 shows the relationship 23 between deceleration of the device and the time interval between detonation of the two explosive squibs 17 and 18. The highest deceleration shown would be caused by the expendable bottom sensor striking a hard rock bottom. The lower decelerations would be caused by the device striking a softer bottom.

FIGURE 5A shows the initial condition of the components as the expendable device sinks at terminal velocity through the water. The squib switch contacts 21 are open. FIGURE 5B shows the detonation of the explosive squib 17 as the magnet 15 is forced downward by the deceleration of the device striking the ocean bottom. The contacts 21 of the squib switch 19 are simultaneously closed. FIGURE 5C shows the detonation of the explosive squib 18 as the magnet 15 returns to its initial position where it actuates the reed switch 11.

It may be seen therefore that I have provided an expendable underwater signaling device which rearily provides information on the resistance to penetration, the hardness, or the bearing strength of the ocean bottom. The time interval between the two acoustic pulses can be estimated or measured electronically depending on the accuracy required. The explosive squibs shown herein provide a broad band acoustic pulse easily detectable by means of hydrophone and amplifier at the surface even in the deepest ocean area. In shallower areas the acoustic pulses may be heard directly by placing an ear against the ship hull or deck. The electrically detonated explosive squibs are available in a wide variety of charge sizes.

A sea water activated battery is shown as the preferred power source. The battery becomes activated within about ten seconds after immersion. This type of battery has a shelf life of several years with no appreciable loss of capacity. Obviously other types of batteries could be used as an alternative. The dimensions and weight of the device are not critical although, once established, they should be uniform so that they need not be individually calibrated. An overall length of 12 inches and a diameter of 2.5 inches are suitable dimensions. An average density giving a terminal velocity of 20 ft./sec. or higher is preferred. Preferred materials are metal for the nosepiece and housing; plastic for the tail assembly; beryllium copper spring; teflon coated aluminum for the tubular support; silicone rubber for the potting material; and lead or other metal for the cylindrical sliding weight. It is generally desirable to store the signaling device inverted so that the spring will not fatigue during long periods of storage.

The expendable signaling device described herein provides a pair of acoustic pulses the interval between which increases with deceleration when the device strikes the bottom. As an alternative, the device could be modified so that the interval between pulses decreases with increasing deceleration. In this latter configuration the total travel of the sliding weight would be limited to about one-half inch and a low tension spring would be used. The sliding weight would be forced down to the lower limit of its travel in response to the slightest deceleration and remain there until the device comes to rest. When the device comes to rest after decelerating the sliding weight is returned by the spring to its initial position. The return travel of the weight should not be slowed by flaps but rather the sliding weight should be unrestrained in both directions. The firing sequence would be the same as described previously but in this latter configuration the interval between detonations would correspond to the total time the device was experiencing a decelerating force whatever its magnitude. Thus when the device strikes a rock bottom the two detonations would occur almost simultaneously. On the other hand when the device strikes a very soft bottom it will penetrate deeply so that the deceleration occurs over a relatively long period of time, typically on the order of one second. The apparatus shown in the drawings may be converted to the alternate mode of operation by removal of the flaps from the top of the sliding weight and by clamping a stop on the tubular support to limit the downward travel of the sliding weight to about one-half inch. The downward travel of the sliding weight and associated magnet need be only enough to assure the transfer of the magnetic reed switch contacts.

The operation of the squib switch may be seen in FIGURE 5. From the drawing it can be easily understood that the function of the squib switch can be combined with the detonation of the first explosive squib 17. An alternate construction would include a pair of contacts on the inside of the cavity occupied by the explosive squib 17. These contacts would be forced together by the detonation of the explosive squib 17 thus eliminating the need for a separate squib switch 19. A second alternative would consist of a pair of contacts within the cavity with the explosive squib 17 which would be bridged by sea water after detonation of the explosive squib 17. In this latter alternative, however, the ground side of the battery should not be connected to the housing as shown in the drawing.

In conclusion, while I have described particular embodiments of my invention for purposes of illustration, it will be understood that various modifications and adaptations thereof may be suggested to those skilled in the art without departing from the spirit and scope of the invention as defined in the following claim.

What is claimed is:

1. Expendable apparatus for determining the resistance to penetration of the ocean bottom comprising: a ballistic-shaped body, the said body having stabilization and weight distribution so as to orient vertically and sink at a predetermined relatively high terminal velocity when dropped into the ocean; a pair of explosive squibs mounted within the said body, the said squibs being ventable to the surrounding water when electrically detonated so that a broad band acoustic pulse is generated; a deceleration responsive switch within the said body; a battery within the said body, the said battery being connected to supply detonation current to the said explosive squibs through the contacts of the said deceleration switch; and means for varying the time interval between the detonations of the said pair of explosive squibs proportional to the deceleration experienced by the said body upon striking the ocean bottom.

References Cited

UNITED STATES PATENTS

| | | | |
|---|---|---|---|
| 2,796,760 | 6/1957 | Warlam | 73—82 |
| 3,298,222 | 1/1967 | Costello et al. | 73—84 |
| 1,514,264 | 11/1924 | Settegast et al. | 181—0.5 |

RICHARD C. QUEISSER, Primary Examiner

JERRY W. MYRACLE, Assistant Examiner

U.S. Cl. X.R.

73—170